United States Patent
Maier et al.

(10) Patent No.: US 7,237,150 B2
(45) Date of Patent: Jun. 26, 2007

(54) METHOD AND DEVICE FOR NON-DESTRUCTIVELY RECOVERING DATA IN A DATA PROCESSING SYSTEM

(75) Inventors: Hans-Ulrich Maier, Karlsruhe (DE); Joachim Rohde, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 436 days.

(21) Appl. No.: 10/666,130

(22) Filed: Sep. 22, 2003

(65) Prior Publication Data

US 2004/0153742 A1 Aug. 5, 2004

Related U.S. Application Data

(63) Continuation of application No. PCT/DE02/00991, filed on Mar. 19, 2002.

(30) Foreign Application Priority Data

Mar. 19, 2001 (DE) ................. 101 13 256

(51) Int. Cl.
*G06F 11/00* (2006.01)

(52) U.S. Cl. ............... 714/36; 714/42; 713/1; 713/2

(58) Field of Classification Search .......... 714/42, 714/36; 713/1, 2
See application file for complete search history.

(56) References Cited

U.S. PATENT DOCUMENTS

| | | | |
|---|---|---|---|
| 4,688,169 A | 8/1987 | Joshi | |
| 5,128,995 A * | 7/1992 | Arnold et al. | 713/1 |
| 5,410,699 A * | 4/1995 | Bealkowski et al. | 713/2 |
| 5,448,045 A * | 9/1995 | Clark | 235/382 |
| 5,463,766 A * | 10/1995 | Schieve et al. | 713/2 |
| 5,469,573 A * | 11/1995 | McGill et al. | 717/127 |
| 5,610,981 A * | 3/1997 | Mooney et al. | 713/185 |
| 5,745,568 A | 4/1998 | O'Conner et al. | |
| 6,317,845 B1 * | 11/2001 | Meyer et al. | 714/23 |
| 6,353,885 B1 * | 3/2002 | Herzi et al. | 713/1 |
| 6,615,365 B1 * | 9/2003 | Jenevein et al. | 714/6 |
| 6,654,797 B1 * | 11/2003 | Kamper | 709/220 |
| 6,711,660 B1 * | 3/2004 | Milne et al. | 711/173 |
| 6,751,569 B2 * | 6/2004 | Merkin et al. | 702/120 |
| 6,820,214 B1 * | 11/2004 | Cabrera et al. | 714/15 |
| 6,865,691 B1 * | 3/2005 | Brundridge et al. | 714/25 |
| 6,889,340 B1 * | 5/2005 | Bramley, Jr. | 714/6 |
| 2002/0087877 A1 * | 7/2002 | Grawrock | 713/200 |
| 2002/0099934 A1 * | 7/2002 | Cromer et al. | 713/2 |
| 2006/0010317 A1 * | 1/2006 | Lee | 713/2 |

FOREIGN PATENT DOCUMENTS

WO    WO 01/14975 A1    3/2001

* cited by examiner

*Primary Examiner*—Robert Beausoliel
*Assistant Examiner*—Christopher McCarthy
(74) *Attorney, Agent, or Firm*—Sughrue Mion, PLLC

(57) ABSTRACT

The invention relates to a method for recovering data in a data processing system (1) according to which a recovery is exclusively effected in predetermined units or installations. A recovery program (3) is run on the data processing system (1). A testing procedure of given hardware features of the data processing system (1) is conducted, and all the features that are characteristic of the data and of the system are stored in a control file of the recovery program (3).

15 Claims, 1 Drawing Sheet

1 Data Processing System
2 Data Input Device
3 Program
4 BIOS

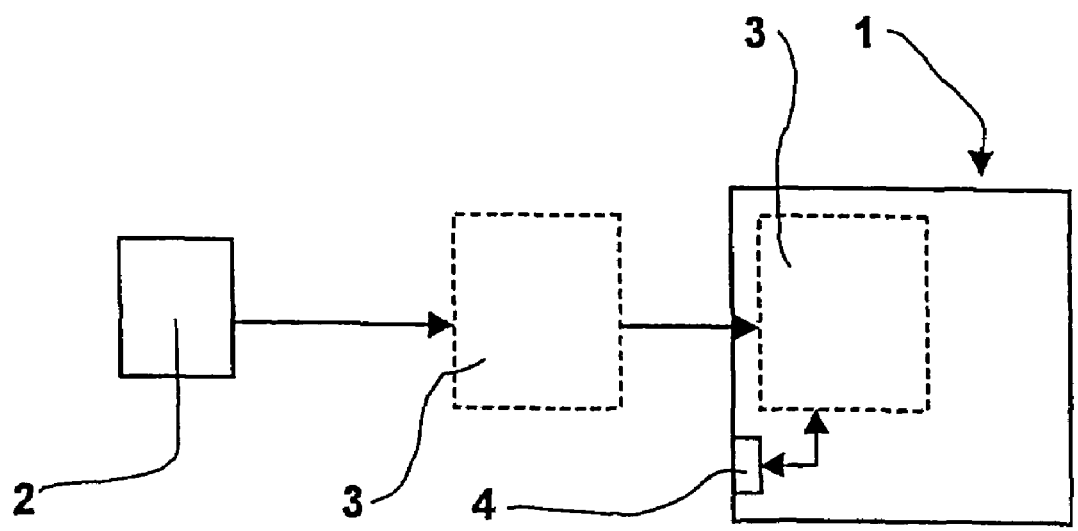
1 Data Processing System
2 Data Input Device
3 Program
4 BIOS

METHOD AND DEVICE FOR NON-DESTRUCTIVELY RECOVERING DATA IN A DATA PROCESSING SYSTEM

This is a Continuation of International Application PCT/DE02/00991, with an international filing date of Mar. 19, 2002, which was published under PCT Article 21(2) in German, and the disclosure of which is incorporated into this application by reference.

FIELD OF AND BACKGROUND OF THE INVENTION

The invention relates to a method for recovering data in a data processing system in which the recovery is carried out exclusively in predetermined units or installations. The invention further relates to a device for carrying out this method.

When using data processing systems, it is frequently necessary to recover data—if possible without data loss—after a system failure or some other system intervention. Recovery typically involves copying data from a recovery medium (e.g. CD, DVD) to the system. This often involves data that requires particular protection and possibly encrypted data, which is to be restored, particularly nondestructively, in a specific memory area of the data processing system. For security reasons, it is further required that the data should be restored only to specific data processing installations selected by the user or to the hardware predetermined by the manufacturer.

Methods for storing or installing data processing programs use, for example, so-called hardware dongles, which link the data to the hardware of the data processing system, or special access elements, such as smart cards with specific codes or other previously assigned release codes, which are relatively complex. Also possible are special device drivers for data readers that enable, for example, access to a compact disc (CD) as a data carrier only as a function of predefined hardware features. This solution is very specific, however, and presumes that the data processing installation is booted from the CD. If external CD-ROM drives are used as the reader, this is possible only with a matching driver and is therefore very inflexible and complex.

Furthermore, conventional recovery methods perform recovery by deleting or overwriting existing data. Often, the recovered data is restored as a single image, recovering the data by copying it from a protected image area of the data carrier. The particular drawback in this case is that the copying process is not nondestructive because the data of at least a partition of the data carrier is deleted.

OBJECTS OF THE INVENTION

Thus, the object of the invention is to further develop a method of the initially described type, so that data can be recovered in a simple, safe and nondestructive manner.

SUMMARY OF THE INVENTION

According to the invention, a method for recovering data in a data processing system is further developed such that a non-destructive recovery is effected exclusively in units or installations that are predetermined, in particular, by the manufacturer. Advantageously, this involves executing a recovery program in the data processing system, which can be used to conduct a testing procedure of predefined hardware features of the data processing system. For this purpose, all the features that are characteristic of the data and the system are simply stored in a control file of the recovery program. It is not necessary, however, for a specific test feature to be a fixed component of the recovery program.

Preferably, the test procedure analyzes one or more special hardware features of the data processing installation, which are stored in a predefined memory area of the data processing system. If they match with the defaults in the control file, the recovery program is continued, if not, the recovery program is aborted. This is to prevent the program from being read and started on unintended or unreleased hardware platforms. The hardware features can include, for example, so-called BIOS addresses or network addresses (Ethernet addresses) or the like.

Particularly advantageously, the special hardware features can be stored as data strings in the BIOS of the data processing system, e.g., in the form of a manufacturer name. In most application cases, the data to be recovered is at least in part encrypted data. The program may be used for any data.

Particularly advantageously, the method according to the invention for recovering data can be carried out using a software module that is programmed in such a way that it has program steps with which the recovery program can be executed in the data processing system. For this purpose, e.g., the following data is stored on a data carrier: unencrypted files, encrypted files, the recovery program and a control file.

In summary, the invention provides the following advantages:

It ensures that data that requires protection and is stored in encrypted form on a storage medium is saved in such a way that the data can be recovered only on predefined hardware without the additional burden of, e.g., a dongle, a smart card or a release code. There is also no dependence on peripheral interfaces, so that it is not necessary to rely, for example, on a printer interface or a serial interface to test the hardware features. The user interface for data recovery can easily be provided in several languages.

Data recovery is in any case nondestructive because it does not involve a so-called image process, i.e., no partition on a storage medium in the data processing system is deleted. Rather, data is restored on an existing partition while leaving original data unchanged. Recovering the data does not require booting from the data carrier with the encrypted data, so that the booting process and the recovery process are decoupled to ensure a high flexibility of the system. The recovery program can furthermore be run on all common operating systems, and it is easy to mix encrypted and unencrypted files, or use exclusively encrypted files, or use exclusively unencrypted files. The files can be encrypted individually rather than in a block, i.e., the unencrypted files can be addressed perfectly normally under the common operating systems. Accordingly, it is possible to selectively recover all data or part of the data.

These and other features of preferred further refinements of the invention are set forth in the claims as well as in the description and the drawings. The individual features may be implemented either alone or in combination in the embodiment of the invention or in other fields of application and may represent advantageous embodiments that are protectable per se, for which protection is herewith claimed.

BRIEF DESCRIPTION OF THE DRAWINGS

The invention will now be described in greater detail, by way of example, with reference to the embodiment depicted in the drawing, which includes a single FIGURE showing a block diagram of a data processing system.

DETAILED DESCRIPTION OF THE PREFERRED EMBODIMENTS

The FIGURE shows, by way of example, a schematic block diagram illustrating a data processing system 1, with a data input device or reader 2, which is used to read the data to be recovered into the data processing system. This data may be encrypted or unencrypted.

Once the data processing system 1 has been booted, a data carrier, e.g., a compact disc (CD) (not depicted) can be used to start the recovery program 3 stored on the data carrier via the data input device or reader 2. This program 3 includes a test procedure, which uses a special hardware feature stored, e.g., in a data string in the BIOS 4 of the data processing system 1 to check whether the program should be continued or aborted with an error message. If the data processing system 1 is equipped with the corresponding hardware feature, the user, while operating the data processing system 1, can select in the next step the data to be recovered and then optionally a target drive in the data processing system 1. Thereafter, the actual recovery process may be started.

A further central control file that is stored on the data carrier and read into the reader 2 contains all the texts, menu information, language information and the data-specific information necessary to run the recovery program 3. This makes it possible to store any kind of data on the data carrier that is used as the recovery medium. The recovery program 3 non-destructively and selectively restores data to the data processing system 1, such that all or part of the data is restored. The control file can be provided with any proportion of encrypted data without the recovery program having to be modified. Only the control file needs be adapted accordingly.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A computer-implemented method for recovering data in a data processing system in which the recovery is carried out exclusively in predetermined units or installations,
   wherein a recovery program is executed in the data processing system,
   wherein a test procedure of predefined hardware features of the data processing system is executed,
   wherein the recovery carried out is non-destructive,
   wherein all the features that are characteristic of the data and the system are stored in a control file of the recovery program, and
   wherein the booting process and execution of the recovery program are decoupled.

2. The computer-implemented method as claimed in claim 1, wherein the test procedure analyzes special hardware features of the data processing system that are stored in a predefined memory area of the data processing system and, if the special hardware features match with defaults in the control file, execution of the recovery program is continued and, if not, execution of the recovery program is aborted.

3. The computer-implemented method as claimed in claim 2, wherein the special hardware features have been stored as data strings in BIOS of the data processing system.

4. The computer-implemented method as claimed in claim 1, wherein the data to be recovered is at least in part encrypted data.

5. The computer-implemented method as claimed in claim 4, wherein the data to be recovered is at least in part unencrypted data.

6. The computer-implemented method as claimed in claim 1, wherein the booting process and execution of the recovery program are decoupled.

7. A device for carrying out the computer-implemented method as claimed in claim 1, wherein the data processing system has a processor module, a working memory and additional storage and input media for executing the recovery program.

8. The computer-implemented method as claimed in claim 1, wherein a software module is programmed to have program steps with which the recovery program is executed in the data processing system.

9. A computer-readable medium with the software module as claimed in claim 8, wherein the computer-readable medium contains at least one of unencrypted and encrypted data to be recovered as well as the recovery program including the control file, and wherein the computer-readable medium is configured to be read into the data processing system by means of a data input device.

10. The computer-readable medium with the software module as claimed in claim 9, wherein the data input device comprises a reader.

11. The computer-readable medium according to claim 9, wherein the computer-readable medium contains both unencrypted data and encrypted data to be recovered.

12. The computer-implemented method as claimed in claim 1, wherein the recovery program comprises instructions for recovering at least some of data of the data processing system lost in a failure of the data processing system.

13. The computer-implemented method as claimed in claim 1, wherein the recovery program is executed on an operating system.

14. The computer-implemented method as claimed in claim 1, wherein the recovery program comprises test procedures for recovering encrypted and unencrypted data of the data processing system.

15. A computer-implemented method for recovering data in a data processing system in which the recovery is carried out exclusively in predetermined units or installations,
    wherein a recovery program is executed in the data processing system,
    wherein a test procedure of predefined hardware features of the data processing system is executed,
    wherein the recovery carried out is non-destructive,
    wherein all the features that are characteristic of the data and the system are stored in a control file of the recovery program, and
    wherein the non-destructive recovery of data comprises not deleting any of partitions on a storage medium in the data processing system and restoring data on an existing partition while leaving original data unchanged.

* * * * *